May 14, 1957  J. D. WORDIE ET AL  2,792,286
CONTINUOUS PROCESS FOR PREPARING AMMONIUM PHOSPHATE
Filed Dec. 23, 1954
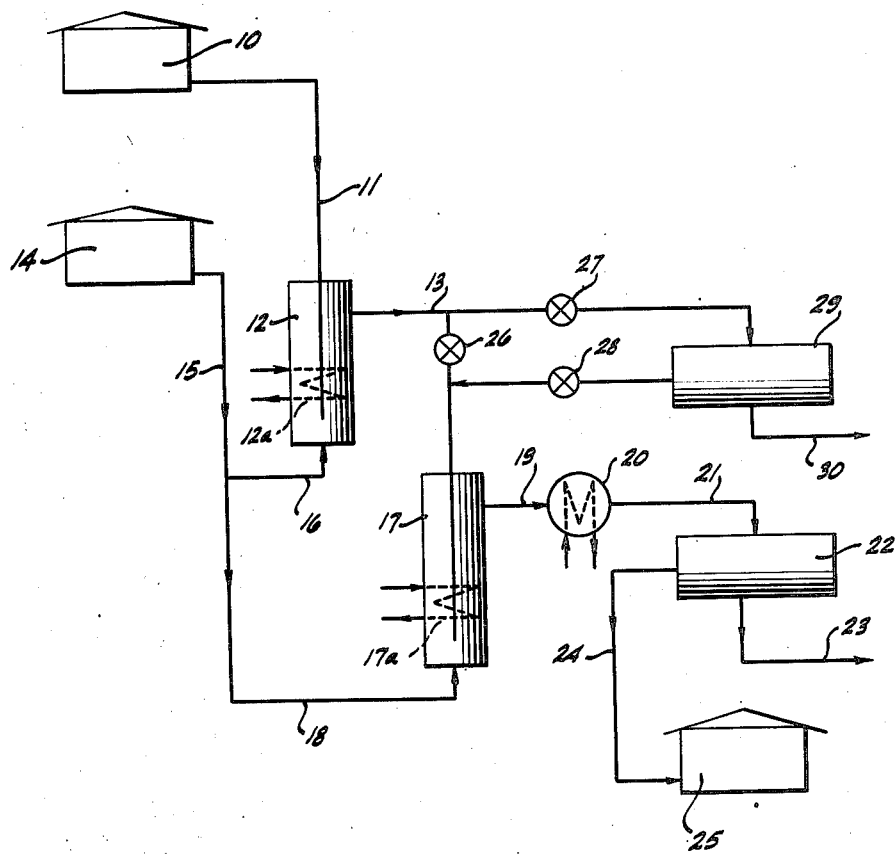
INVENTORS.
JOHN D. WORDIE,
DAVIS A. SKINNER,
BY Richard C. Hartman
ATTORNEY.

United States Patent Office 2,792,286
Patented May 14, 1957

2,792,286

CONTINUOUS PROCESS FOR PREPARING AMMONIUM PHOSPHATE

John D. Wordie and Davis A. Skinner, Fullerton, Calif., assignors to Union Oil Company of California, Los Angeles, Calif., a corporation of California Application December 23, 1954, Serial No. 477,188

9 Claims. (Cl. 23—107)

This invention relates to the preparation of ammonium phosphate, and in particular concerns a continuous process for preparing aqueous ammonium phosphate from crude "wet-process" phosphoric acid.

The manufacture of ammonium phosphate in aqueous form by reaction between crude "wet-process" phosphoric acid and ammonia involves serious technical difficulties attributable to the presence of impurities in the crude acid. The latter (sometimes referred to as "green acid" because of its color) is obtained by treating phosphate rock, which essentially comprises calcium phosphate, with sulfuric acid and filtering off the insoluble calcium sulfate which is formed as a by-product. The crude "green" acid product is highly impure in that it contains relatively large amounts of dissolved calcium sulfate, fluorides and fluosilicates, salts of aluminum, magnesium, iron and other metals, as well as suspended organic matter and carbon. When such crude acid is treated with ammonia in the ordinary manner to form ammonium phosphate the impurities originally present in the acid are thrown out of solution as gelatinous precipitates which are substantially impossible to separate from the aqueous phase by methods adapted to use on a commercial scale. Accordingly, it is necessary to resort to special operating techniques in order to effect the formation of the precipitated solid impurities in granular and readily filterable form, but such methods are not adapted to continuous operation. When it is attempted to apply such special techniques to a continuous process to form a substantially neutral product (pH=6.3 or greater) the solid impurities are formed in the aforesaid gelatinous substantially non-filterable form and it is practically impossible to obtain the desired clear solution.

It is accordingly an object of the present invention to provide an improved method for the manufacture of ammonium phosphate from crude wet-process phosphoric acid.

Another object is to provide a continuous process whereby crude wet-process phosphoric acid is substantially neutralized with ammonia to form a clear liquid ammonium phosphate solution adapted for use as a fertilizer.

A further object is to provide a means whereby the solid impurities which are thrown out of solution when crude wet-process phosphoric acid is treated with ammonia are caused to be formed in granular readily filterable form.

Other objects will be apparent from the following detailed description of the invention, and various advantages not specifically referred to herein will occur to those skilled in the art upon employment of the invention in practice.

We have now found that the above and related objects may be realized by effecting the reaction between crude wet-process phosphoric acid and ammonia in such manner that the bulk of the impurities normally incident in the acid are precipitated in solid form at a relatively high hydrogen ion concentration (low pH value) and the remainder of such impurities is subsequently precipitated at a lower hydrogen ion concentration. More particularly, we have found that the aforementioned difficulties may be obviated in a two-stage process in which crude wet-process phosphoric acid containing normally incident impurities which precipitate in solid form when the acid is treated with ammonia is reacted in a first stage with sufficient ammonia to produce an intermediate product having a pH value of 4.0–4.2, and such intermediate product is reacted in a second stage with a further quantity of ammonia to produce a final product having a pH value of about 6.3–6.7. Said final product contains the aforesaid solid impurities in granular and easily separated form, and is of such concentration, pH value, and composition as to be well adapted to use as a fertilizer. The process can be carried out continuously in any desired scale and without need for special equipment.

Referring now to the single figure of the accompanying drawing which forms a part of this specification and which represents a diagrammatic flow sheet of the process of the invention, crude wet-process phosphoric acid is continuously withdrawn from storage facility 10 and is passed through conduit 11 into first stage reactor 12 provided with internal heating means 12a. Conduit 11 extends within reactor 12 to a point near the bottom thereof so that the fresh acid is introduced at the bottom of the body of liquid reaction mixture which fills the reactor. The latter is fitted near its top with an overflow conduit 13 so that the reactor is maintained substantially full throughout operation of the process. Simultaneously, ammonia is continuously withdrawn from storage facility 14 and is passed through conduits 15 and 16 into the bottom of reactor 12. Within the latter, the ammonia and acid react at an elevated temperature to form an intermediate ammonium phosphate product which is continuously withdrawn through overflow conduit 13 at a rate equal to the sum of the rates at which the ammonia and acid are introduced into reactor 12. The amount of ammonia introduced into reactor 12 is controlled with respect to the phosphoric acid introduced therein so that the intermediate product which is withdrawn therefrom has a pH value of 4.0–4.2. Said intermediate product is passed through conduit 13 which extends within second stage reactor 17 to a point near the bottom thereof. Within reactor 17, which is provided with heating coils 17a, the intermediate product reacts with a further quantity of ammonia introduced into the bottom of reactor 17 through conduits 15 and 18. Said quantity is so controlled that the final product which is withdrawn from reactor 17 through overflow conduit 19 and passed to product cooling means 20 has a pH value of 6.3–6.7. The cooled product passes from cooling means 20 via conduit 21 to a continuous separator 22, which may be a rotary-type filter operating under vacuum, wherein the precipitated solids are filtered off and passed to storage or otherwise disposed of through conduit 23. The filtrate from filter 22, comprising a substantially neutral clear aqueous solution of ammonium phosphate, is passed via conduit 24 to storage facility 25. If desired, the solids formed in the first stage reactor may be separated prior to introduction of the intermediate product into second stage reactor, as by closing valve 26 in conduit 13 and opening valves 27 and 28 to permit the product which is withdrawn from reactor 12 to pass through filtering means 29, wherein the solids are separated and discharged through line 30, before being passed to reactor 17.

Considering now the process in greater detail, the phosphoric acid reactant is the previously described crude wet-process acid containing various metallic impurities in the form of sulfates, fluorides, phosphates, etc. A complete description of such acid and the process by which it is made is set forth by W. H. Waggaman in "Phosphoric Acid, Phosphates and Phosphatic Fertilizers" at pages 174-208. Such acid is available commercially in both dilute and concentrated form, containing 20-30 and about 35-55 weight percent of $P_2O_5$, respectively. For purposes of the present process either may be employed although the concentration of $P_2O_5$ in the first stage reaction zone should be maintained between about 20 and about 30 weight percent. Accordingly, when the acid is employed in 20-30 percent concentration the ammonia is conveniently employed in gaseous anhydrous form, whereas when concentrated acid is employed suitable dilution of the same is conveniently accomplished by supplying the ammonia in the form of an aqueous solution.

The first stage of the process consists essentially in partially neutralizing the phosphoric acid with the ammonia. Such treatment results in the precipitation of solid materials derived from the impurities originally present in the crude acid. The reaction is effected at a temperature between about 200° F. and about 215° F. Since the heat of neutralization is insufficient to maintain the proper reaction temperature the reactor should be equipped with suitable heating means, such as one or more internal coils through which steam or other heat transfer fluid can be circulated, and is desirably lagged with thermal insulation. The interior surfaces of the reactor should of course be constructed of a material such as stainless steel which will resist attack by the acidic reaction mixture at the prevailing temperature. In the interests of avoiding an undesirably viscous final product and accompanying difficulties in filtering the solid impurities therefrom, it is desirable to effect the first stage reaction with a minimum of agitation within the reaction zone. We have found that satisfactory admixture of the ammonia and acid without undue agitation can be achieved by carrying out the reaction in an elongated vertical vessel or tower and introducing the acid and gaseous ammonia into the bottom thereof so that the reactants react while passing upwardly through the reactor.

It is essential to the success of the process that the amount of ammonia introduced into the first stage reactor be such that the pH value of the product therein formed be between about 4.0 and about 4.2. If excess ammonia is employed so that the pH value is greater than about 4.2, the solid impurities in the product are formed in a flocculent condition and are almost impossible to separate from the aqueous phase by filtration. On the other hand, if insufficient ammonia is employed so that the product has a pH value below about 4.0, the bulk of the impurities originally present in the acid is precipitated in the second stage of the process and in substantially infilterable form. The exact quantity of ammonia required to form a product having the requisite pH value will depend upon the concentration of the acid reactant and the amount of impurities contained therein, but will usually be between about 0.27 and about 0.31 pound of ammonia per pound of $P_2O_5$ supplied to the reactor. Conveniently, the amount of ammonia is controlled by varying its rate of introduction into the reactor via means responsive to the pH value of the product withdrawn from the reactor.

The period of time over which the reactants are subjected to the elevated reaction temperature in the first stage reactor is also of some influence on the physical reaction of the precipitated solid impurities. Preferably, the reactor volume and the rates at which the reactants are introduced and the product is withdrawn are so correlated that such period of time is between about 0.25 and about 1.25 hours.

The intermediate product which is withdrawn from the first stage reactor takes the form of a slurry comprising partially neutralized phosphoric acid and the aforesaid solid impurities. The amount of the latter will of course depend upon the amount of their progenitors in the crude acid. The product is preferably passed directly from the first stage reactor to a second stage reactor without cooling, and in the latter reactor it is treated with sufficient ammonia to raise its pH value to between about 6.3 and about 6.7, preferably to about 6.5. Such treatment effects the further precipitation of solid impurities, but the amount of the same is small compared with the amount formed in the first stage. Except for the amount of ammonia employed and the resulting pH value of the product, the second stage reaction is suitably carried out in substantially the same manner as the first, i. e., the temperature is maintained between about 200° F. and about 215° F. and the reaction time is approximately the same. Conveniently, the same type of reactor is employed and the method of introducing the reactants and withdrawing the products is the same, although different modes of operation may be employed if desired. Also, the amount of ammonia may be controlled by varying its rate of introduction according to the pH value of the product. Usually, between about 0.09 and about 0.13 pound of ammonia is employed per pound of $P_2O_5$ in the second stage reactor.

The product withdrawn from the second stage reactor consists of a slurry of solid impurities in aqueous ammonium phosphate, and is preferably cooled somewhat prior to separating the solids. The latter operation may suitably be carried out at a temperature of 140°-200° F., preferably about 180° F. Any of the conventional types of centrifuges or filtering apparatus may be employed, although the rotary vacuum type is preferred. Excellent results have also been obtained with a leaf filter operating under a vacuum of 10 inches of mercury with a monofilament polyethylene filter cloth. The filter cake, comprising the aforementioned solid impurities, usually contain about 45 percent available $P_2O_5$ and may be treated to recover various values therefrom or marketed as a solid fertilizer. The filtrate is a substantially clear aqueous solution which is particularly well suited for use as a liquid fertilizer. It contains about 8 percent available nitrogen and 24 percent available phosphorus, corresponding to the fertilizer designation "8-24-0."

The following example will illustrate the principle of the invention but is not to be construed as limiting the same.

*Example*

Crude wet-process phosphoric acid analyzing 24.3 weight percent $P_2O_5$, was continuously introduced at a rate of 1500 volumes/hour into a cylindrical reactor through a conduit which passed downwardly through the center thereof to a point adjacent the bottom. The reactor was fitted with an overflow conduit near the top so that its effective capacity was 1025 volumes. Simultaneously, anhydrous gaseous ammonia was introduced into the bottom of the reactor at a rate of 177,700 volumes/hour STP. The contents of the reactor were maintained at a temperature of about 215° F. by means of suitable heating coils, and the rate of introduction and withdrawal were such that the residence time of the reactants within the reactor was about 0.7 hour. The effluent from the overflow conduit, having a pH value of 4.1, was passed into a second reactor constructed like the first but having a capacity of 1160 volume units. Gaseous ammonia was passed into the second reactor at a rate of 66,300 volumes/hour, and the reactor contents were maintained at a temperature of about 215° F. as before. The effluent from the second reactor, having a pH value of 6.5, was passed directly to a continuous filter where the precipitated solids were filtered off at a temperature of about 180° F. and under a reduced pressure of 10 inches of mercury. Said solids were of granular form and the filtration operation proceeded smoothly and rapidly to give a granular filter cake and a clear filtrate.

The preceding operation was repeated, changing the rates of addition of ammonia into the reactor so that the effluent from the first reactor had a pH value of 3.0 and that from the second reactor had a pH value of 6.5. Considerable difficulty was had in filtering the precipitated solids from the effluent of the second reactor; the filter rate was very slow and the filter cake was a gelatinous mass. Similar difficulties were experienced when the second reactor was eliminated and the rate of ammonia addition to the first reactor was raised so that the effluent thereof had a pH of 5.0.

Other modes of applying the principle of our invention may be employed instead of those explained, change being made as regards the materials and apparatus employed, provided the step or steps stated by any of the following claims, or the equivalent of such step or steps, be employed.

We, therefore, particularly point out and distinctly claim as our invention:

1. A process for preparing aqueous ammonium phosphate which comprises the steps of continuously passing ammonia and crude wet-process phosphoric acid containing normally incident impurities which precipitate as solids upon treatment of said acid with ammonia into a first reaction zone wherein said ammonia and said acid are subjected to a temperature between about 200° and about 215° F. for a period of time between about 0.25 and about 1.25 hours, the amount of ammonia introduced into said first reaction zone being such that the product formed therein has a pH value between about 4.0 and about 4.2 and the concentration of $P_2O_5$ within said first reaction zone being maintained between about 20 and about 30 percent by weight; continuously withdrawing the product formed in said first reaction zone; continuously passing said product and additional ammonia into a second reaction zone wherein said product and ammonia are subjected to a temperature between about 200° and about 215° F. for a period of time between about 0.25 and about 1.25 hours, the amount of ammonia being introduced into said second reaction zone being such that the product formed therein has a pH value between about 6.3 and about 6.7; continuously withdrawing said product from said second reaction zone; and controlling the loss of water during said steps so as to avoid the formation of solid crystalline ammonium phosphate.

2. The process of claim 1 wherein the crude wet-process phosphoric acid employed contains between about 20 and about 30 percent by weight of $P_2O_5$ and the ammonia is employed in gaseous substantially anhydrous form.

3. The process of claim 1 wherein the crude wet-process phosphoric acid employed contains between about 35 and about 55 percent by weight of $P_2O_5$ and the ammonia is employed in aqueous solution.

4. The process of claim 1 wherein the product which is withdrawn from the said first reaction zone is continuously treated to remove the solids contained therein prior to its introduction into said second reaction zone.

5. A process for preparing a substantially clear aqueous ammonium phosphate solution which comprises the steps of continuously passing ammonia and crude wet-process phosphoric acid containing normally incident impurities which precipitate as solids upon treatment of said acd with ammonia into a first reaction zone wherein said ammonia and said acid are subjected to a temperature between about 200° and 215° F. for a period of time between about 0.25 and about 1.25 hours, the amount of ammonia introduced into said first reaction zone being such that the product formed therein has a pH value between about 4.0 and about 4.2 and the concentration of $P_2O_5$ within said first reaction zone being maintained between about 20 and about 30 percent by weight; continuously withdrawing the product formed in said first reaction zone, continuously passing said product and ammonia into a second reaction zone wherein said product and additional ammonia are subjected to a temperature between about 200° and about 215° F. for a period of time between about 0.25 and about 1.25 hours, the amount of ammonia being introduced into said second reaction zone being such that the product formed therein has a pH value between about 6.3 and about 6.7; continuously withdrawing said product from said reaction zone; continuously separating solids from said product; and controlling the loss of water during said steps so as to avoid the formation of solid crystalline ammonia phosphate.

6. The process of claim 5 wherein the crude wet-process phosphoric acid employed contains between about 20 and about 30 percent by weight of $P_2O_5$ and the ammonia is employed in gaseous substantially anhydrous form.

7. The process of claim 5 wherein the crude wet-process phosphoric acid employed contains between about 35 and about 55 percent by weight of $P_2O_5$ and the ammonia is employed in aqueous solution.

8. The process of claim 5 wherein the product which is withdrawn from the said first reaction zone is continuously treated to separate solids therefrom prior to its introduction into the said second reaction zone.

9. The process of claim 5 wherein the separation of solids from the product withdrawn from the said second reaction zone is effected at a temperature between about 140° and about 200° F.

References Cited in the file of this patent

UNITED STATES PATENTS

| | | |
|---|---|---|
| 1,822,040 | Klugh et al. | Sept. 8, 1931 |
| 1,879,204 | Guillissen | Sept. 27, 1932 |
| 2,033,389 | Moose | Mar. 10, 1936 |